United States Patent

Waddill et al.

Patent Number: 4,789,721
Date of Patent: Dec. 6, 1988

[54] CURATIVES OF EPOXY RESINS FROM DICARBOXYLIC ACIDS, INCLUDING (1) INDANE OR (2) TERT-BUTYLISOPHTALIC DERIVED ACIDS, REACTED WITH POLYETHERDIAMINES

[75] Inventors: Harold G. Waddill, Austin; Jiang-Jen Lin, Round Rock; George P. Speranza, Austin, all of Tex.

[73] Assignee: Texaco Inc., White Plains, N.Y.

[21] Appl. No.: 78,310

[22] Filed: Jul. 27, 1987

[51] Int. Cl.$^4$ ................... C08G 59/44; C08G 59/54
[52] U.S. Cl. ................................................. 528/111
[58] Field of Search ........................................ 528/111

[56] References Cited

U.S. PATENT DOCUMENTS

| | | | |
|---|---|---|---|
| 3,257,342 | 6/1966 | Kwong | 525/504 |
| 3,380,881 | 4/1968 | Williamson et al. | 528/361 |
| 4,239,635 | 12/1980 | Rieder | 562/507 |
| 4,588,783 | 5/1986 | Chang | 528/288 |

Primary Examiner—John Kight
Assistant Examiner—Frederick Krass
Attorney, Agent, or Firm—Jack H. Park; Kenneth R. Priem; Cynthia L. Kendrick

[57] ABSTRACT

Carboxylic acid-polyetherpolyamine reaction products which contain as the principle reaction component, an amidoamine having the formula:

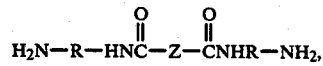

where
R = polyether segment as previously defined.
Z = dicarboxylic acid of structure given in Examples 2 and obtained by reacting a polyoxypropylene and/or polyoxyethylene diamine with an aromatic dicarboxylic acid in molar proportions such that at least about 1.0 to 1.2 mole equivalents of amine are provided in the reaction mixture of each mole equivalent of carboxylic acid present in the reaction mixture. The amidoamines exhibit improved properties which allow for a rapid curing system even under ambient conditions and useful applications include coatings, adhesives, encapsulations, laminates and composite fabrications.

3 Claims, No Drawings

CURATIVES OF EPOXY RESINS FROM DICARBOXYLIC ACIDS, INCLUDING (1) INDANE OR (2) TERT-BUTYLISOPHTALIC DERIVED ACIDS, REACTED WITH POLYETHERDIAMINES

TECHNICAL FIELD OF THE INVENTION

This invention relates to amidoamines. More particularly, this invention relates to novel amidoamines derived from polyether amines and aromatic dicarboxylic acids and especially to their use as curatives for epoxy resins. The amidoamines exhibit improved properties which allow for a rapid curing system, even under ambient conditions. Excellent properties are exhibited on curing epoxy resins with these products, and materials are provided which should be useful in a number of applications such as coatings, adhesives, encapsulations, laminates and composite fabrications and sealants. The amidoamines of this invention are prepared by reacting at least about 2 mole equivalents of a polyether amine with an aromatic dicarboxylic acid to thereby couple each of the carboxyl groups to an amine group by the formation of an amide linkage therebetween. The reaction to produce the amidoamines is preferably conducted at autogenous pressure at a temperature within the range of about 0° C. to about 250° C. and preferably above 150° C.

BACKGROUND

In a related area of study U.S. Pat. No. 4,239,635 discloses carboxylic acid terminated diamides and alkalai metal, ammonium or amine salts thereof which are derived from the reaction of organic polycarboxylic acids and polyoxyalkylene diamines. The diamides have lubricating properties.

There is disclosed in U.S. Pat. No. 4,588,783 an amide-containing hydroxy ethyl carbamate and a coating composition comprising same, the preparation thereof entailing the reaction of an amidoamine and an cyclic organic carbonate.

In U.S. Pat. No. 3,257,342, there is disclosed an epoxy resin composition basically comprising a polyglycidyl ether, an amino-terminated polyamide of a polymeric fatty acid and a compound of the formula:

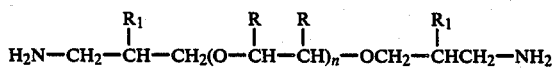

wherein n is an integer of from 1 to 6, $R_x$, is hydrogen or methyl and each R group is hydrogen or an alkyl.

It is known, as exemplified by U.S. Pat. No. 3,654,370 to prepare polyoxyalkylene polyamines by the reductive amination of a polyoxyalkylene polyol. These polyamines have found utility as curing agents for epoxy resins, as plasticizers, as cross-linking agents and binders for textiles, and as intermediates in the preparation of polyureas. In general, polyoxyalkylene polyamines having molecular weights ranging from about 200 to about 5000 can be prepared by the Yeakey process.

The polyoxyalkylene polyamines of the type disclosed in Yeakey U.S. Pat. No. 3,654,370 are prepared by the oxyalkylation of a polyhydric alcohol. The preferred starting materials are dihydric and trihydric alcohols such as propylene glycol or glycerol and propylene oxide or ethylene oxide. Copolymer polyols of ethylene oxide and propylene oxide are also useful, particularly those containing from about 5 to about 40 wt% of ethylene oxide and corresponding from about 95 to about 60 wt% of propylene oxide.

The molecular weight of the polyol is determined by the number of moles of epoxides that are reacted with the alcohol initiator. Since the addition is random, the final alkoxylation product will not be a pure compound but, rather, will be a mixture of polyoxyalkylene polyols. For example, if the polyol is a polyol prepared by reacting glycerol or trimethylol propane with propylene oxide, using an amount of propylene oxide adequate to provide for an average molecular weight of about 1000, the final propoxylation product will actually be composed of a mixture of polyoxypropylene triols having molecular weights varying from about 800 to about 1200, the molecular weight distribution following a Gaussian distribution curve (sometimes referred to as a sine curve or a Poissan curve). As the molecular weight of the polyol increases, the spread in the molecular weights will also increase. Thus, when the average molecular weight of the triol is about 3000, the deviation will be about ±400 molecular weight units so that most of the product will fall within the molecular weight range of about 2600 to about 3400.

As the molecular weight is still further increased, the percentage of free hydroxyl groups in the reaction mixture will decrease because of the added bulk of the already formed polyol, thus making the addition of more propylene oxide groups progressively more difficult. As a practical matter, when the triol reaches an average molecular weight of about 5000, further propoxylation is accomplished only with extreme difficulty and, therefore, the highest molecular weight polyoxypropylene triol obtainable from glycerol of an equivalent triol such as trimethylol propane will have an average molecular weight of about 5000. The 5000 molecular weight polyoxypropylene triols will have a molecular weight distribution of about ±1000 so that the actual molecular weight range will be from about 4000 to about 6000. Again, the molecular weight distribution follows a Gaussian distribution curve.

A further complication is encountered during the propoxylation to the higher molecular weights. As the reaction time and temperature are increased to encourage propoxylation, there is introduced a tendency on the part of the propylene oxide to isomerize to allyl alcohol and a tendency on the part of the hydroxypropyl end groups of the polyoxypropylene triol to dehydrate to form a terminal olefin group and water. Both the water and the allyl alcohol are susceptible to oxyalkylation thereby diluting the polyoxypropylene diol with undesired generally low molecular weight diol contaminants derived from the water and monofunctional allyl alcohol propoxylates. From as little as 1% to as much as 10% of the oxypropyl end groups of the triol may dehydrate to form groups with terminal unsaturation in increasing the average molecular weight from about 3000 to about 5000.

When a polyoxypropylene polyol of this nature is reductively aminated in accordance with the procedure of U.S. Pat. No. 3,654,370, comparatively higher temperatures and longer reaction times are required as the molecular weight of the polyol increases. This can result in the cleavage of the polyol to form undesired and unwanted alkyl ether by-products and hydrogenation of the unsaturated groups on the polyol to form propyl ethers.

In copending Application Ser. No. 078,323 the contents of which is herein incorporated by reference, there has been disclosed a process for reducing molecular weight distribution and terminal unsaturation problems by the formation of amidoamines containing terminal primary amine groups which are analogous in function and reactivity to the polyoxyalkylene polyamines of U.S. Pat. No. 3,654,370, but which are characterized by a significantly narrower molecular weight distribution and significantly lower by-product contamination. According to that invention, when the amine is in excess, a primary amine group of the polyamine will preferentially react with each of the carboxyl groups of the di- or tricarboxylic acid, ester or anhydride thereof and be linked thereto through an amide linkage. However, the free primary amine groups will not interact and the reaction will terminate with the formation of an addition product of the polyamine with the carboxylic acid such that the addition product is substantially free from carboxylic groups and contains primarily terminal primary amine groups.

An amidoamine with these improved characteristics would represent a great advance in the art. It has now been discovered that amidoamines with these characteristics exhibit improved properties as epoxy resin curatives in the method of this invention. Other objects may be apparent to those skilled in the art.

SUMMARY OF THE INVENTION

In accordance with the present invention, this invention is directed to condensation products of polycarboxylic acids and polyetheramines and their use as curatives of epoxy resins. These polyamidoamines, when combined with an epoxy resin in the proper stoichiometric amount, result in a rapid curing system, even under ambient conditions.

The condensation products are the product of a reaction between certain polyetheramines, exemplified by JEFFAMINE® EDR series and certain dicarboxylic acids at a temperature of 150° C. to 250° C. and atmospheric pressure.

One of these products can be represented by formula I:

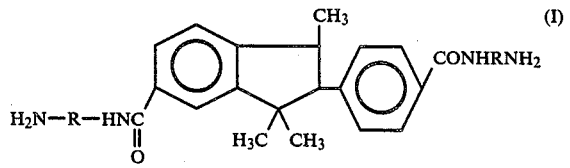

wherein R=polyether segment, either polyoxypropylene or polyoxyethylene or both in combination.

Another of these amidoamine products may be represented by formula II:

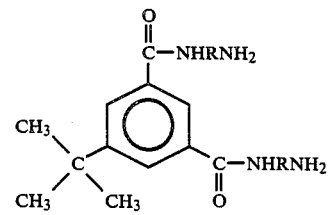

where R=a polyether segment, either polyoxypropylene or polyoxyethylene or both in combination.

DETAILED DESCRIPTION

The amidoamine reaction products used as curing agents of uncured epoxy resins in the present invention are reaction products which contain as the principle reaction component, an amidoamine having either formula I:

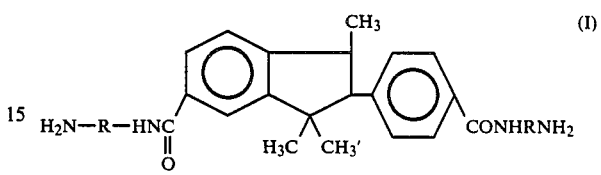

which is the reaction product of phenylindane dicaarboxylic acid, (1,1,3-trimethyl-3-phenylindane-4',5-dicarboxylic acid) and a polyether amine wherein R is a polyether segment, either polyoxypropylene or polyoxyethylene or both in combination, or formula II:

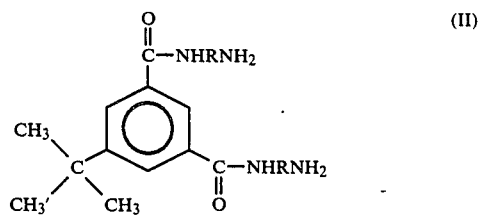

which is the reaction product of t-butyl isophthalic acid and a polyether amine, wherein R has the same meaning as in (I) above.

Encompassed within the above formulas are reaction products of dicarboxylic acids with polyoxyalkylene diamines which will contain two terminal primary amine groups.

In the instant invention it has been discovered that these amidoamine reaction products of dicarboxylic acids and polyether amines have improved properties which make them valuable as epoxy curing agents. When combined with an epoxy resin in proper stoichiometric amounts these amidoamines result in a rapid curing system, even under ambient conditions. Excellent properties are obtained on curing of these epoxy amidoamine systems. Such combinations are useful in a number of applications such as coatings, adhesives, encapsulations, laminates, composite fabrications and sealants.

Composition of the amidoamine is apparently critical in obtaining the improved curing properties. The polyetherpolyamine portion may be polyoxypropylene or polyoxyethylene or combinations of these and may range in molecular weight from ~200 to ~6000. The composition of the dicarboxylic acid is critical with regard to increased compatibility with epoxy resin, and thus leads to enhanced properties over similar amidoamines.

Preferred dicarboxylic acids are aromatic.

The dicarboxylic acid used as a reactant for the present invention may be any suitable aromatic carboxylic acid having functionality of ≧2. The anhydrides and lower alkyl esters of the acids wherein the alkyl group contains 1 to 4 carbon atoms, and is preferably methyl, may also be used. Examples of aromatic dicarboxylic acids that may be used as starting materials for the present invention include acids such as terephthalic acid, isophthalic acid, trimesic acid, 1,1,3-trimethyl-3-phenylindane-4′,5-dicarboxylic acid, 2,6-naphthalene dicarboxylic acid, t-butyl isophthalic acid, etc. Also included are benzene dicarboxylic acids, hemimellitic acid, 2-phenyl pentanedioic acid, phenyl succinic acid, trimellitic, etc.

The preferred dicarboxylic acids are phenylindane (1,1,3-trimethyl-3-phenylidane-4′,5-dicarboxylic acid) and t-butyl isophthalic acid.

The polyetherpolyamine starting materials for the present invention may include several different amines. In general, the polyetherpolyamine starting material may be defined as a polyetherpolyamine having the formulas:

1.

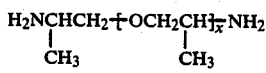

where x is from 2.6 to 33.1;

2. $H_2NCH_2CH_2(OCH_2CH_2)_x—NH_2$; x=0, 1, 2
3. $H_2NCH(CH_3)CH_2\text{\textemdash}[OCH(CH_3)CH_2]_x\text{\textemdash}[OCH_2CH_2]_y\text{\textemdash}[OCH_2CH(CH_3)]_z NH_2$;

Amines with functionality of >2 of the following formula cannot be used in preparation of amidoamines.

4.

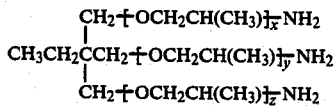

In general, the average molecular weight of the polyoxypropylene diamine starting material will be from about 200 to about 6000.

An advantage is obtained when using lower molecular weight diamine starting materials such as those having average molecular weights of about 200 to about 3000 in that the final products will have primary amine functionalities and higher molecular weights but will not contain contaminants of the type formed by the oxypropylation of dihydric and trihydric alcohols with propylene oxide to form polyoxypropylene diols and triols having molecular weights of 3000 to 5000.

One group of appropriate polyoxyalkylene diamines, containing both ethylene oxide and propylene oxide, which may be used are polyoxypropylene diamines having the formula:

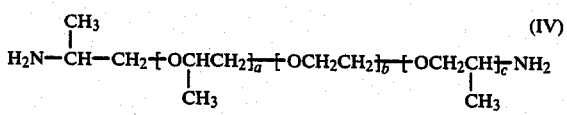

Wherein a+c equals a number having a value of from about 2 to about 3 and b is a number having a value of from about 5 to about 45. The preferred amines include polyoxypropylene and polyoxytheylene or a combination thereof.

It will be apparent to those skilled in the art that many of the suitable polyoxyalkalene polyamines may be available as and used as commercial mixtures of several components. Useful commercial materials include those available under the trademark JEFFAMI-NE ® D-, T- and ED-, etc. marketed by Texaco Chemical Co.

Commercial products used in the examples of this invention include JEFFAMINE ® EDR-148 and JEFFAMINE ® EDR-192. These are polyoxyalkylene amines produced by Texaco Chemical Co. under the name JEFFAMINE ® ED Series Amines.

It has been discovered that an amidoamine addition product is preferentially formed when an aromatic dicarboxylic acid is reacted with an excess of a polyoxyalkylene diamine at autogenous pressure at a temperature within the range of about 150° to about 250° C. for a reaction time within the range of about 0.5 to about 12 hours.

The reaction to form the amidoamines may be carried out in the absence of added solvent-diluent, but the latter may be present if desired including water, toluene, etc. By-product water of reaction is preferably removed from the reaction mixture as formed. The reaction is complete when essentially all of the carboxylic groups have reacted with primary amine groups of the polyoxyalkylene diamine or triamine. Under the noncatalytic reaction conditions employed herein, the primary amine groups of the polyoxyalkylene diamine or triamine are essentially unreactive with each other.

The amidoamines that are formed are liquid or amorphous solid materials having a molecular weight within the range of about 400 to about 6000 and containing usually 2 terminally primary amine groups.

It can be demonstrated that the novel amidoamines described above and in copending U.S. Application Ser. No. 078,323, when combined with an epoxy resin, provide improved curing properties.

An epoxy resin which may be cured by the process of this invention may typically be one prepared for example by the reaction of Bisphenol A with epichlorohydrin in the presence of sodium hydroxide. After condensation is complete, the crude resin is freed of residual epichlorohydrin, washed well to remove salt and soluble by-products, and recovered.

Curing of such a resin is effected in the presence of variable amounts of the amidoamine of this invention. Preferably the epoxy resin is a liquid. Among those which have demonstrated the effectiveness of the instant invention are diglycidyl ethers of Bisphenol A, such as liquid epoxy resin EEW~185. (EEW=epoxy equivalent weight; molecular weight of resin=~380; functionality ~2; equivalent weight ~185–190.)

The novel amidoamine should be present in the epoxy resin in an amount sufficient to provide about 0.8 to 1.2 amino ($NH_2$) groups per oxirane group of the epoxy resin.

Practice of the novel method of this invention may be apparent from the following description in Examples I through VII of the preferred embodiment.

This method of curing epoxy resins with the amidoamines herein described allows for the production of compositions with properties which would have a number of useful applications such as coatings, adhesives, incapsulations, laminates, composite fabrications and sealants. Many properties which can be obtained by variations of the invention are demonstrated in Examples I through VII.

Thus, Examples I and III through VII demonstrate the method of this invention for curing epoxy resins with novel amidoamines to provide compositions with excellent coating properties.

In the Examples which represent the process of this invention, the preparation of a cured epoxy resin is carried out in the following manner:

Epoxy resin is normally used without dilution and without other additives. The curing agent(s) in this case were the more viscous component(s). Solvents (butanol), therefore, were added to the curative component along with leveling agent.

A component is prepared containing variable amounts, of liquid epoxy resin, butanol and leveling agent.

To this compound is added an equivalent amount of the amidoamine. The mixture is then mixed, degassed[1] and poured into molds. After curing, the cured materials are cut into test samples by precision methods.

[1] Degassed-freed of entrapped air through application of vacuum.

In the various Examples, the following properties are measured.

Drying Time—a reproducible determination of various stages and rates of film formation in drying and curing of organic coatings. A Gardner Circular Drying Time Recorder was used.

Pencil Hardness—film hardness rated according to hardness of lead pencil [4B(soft) to 6H (hard)] required to scratch or gauge a film ASTM D-b 3363-74.

Impact—as measured by Gardner impact, in-lbs. to fail. A known weight is allowed to fall from a measured height to exert a certain force upon a film sample by means of a round-nose punch. After striking, the film is examined for damage. ASTM D2794-69 (1974).

Tensile Shear Strength—ASTM D 1002— Strength properties, in psi, of an adhesive when loaded to produce shear distortion of planes parallel to the plane of the adhesive bond.

T-peel strength, pli—ASTM D 1876— a test made on bonded strips of metals by peeling the metal strips back and recording the adhesive strength values.

The amidoamine of Example I is that formed by condensing phenylindane dicarboxylic acid with a polyetheramine. The resin used is EEW ~ 185 Epon 828; liquid epoxy resin of equivalent weight ~ 185–190.

In the examples demonstrating compositions with coating properties a leveling agent is used in order to aid in the uniform dispersion of the components of the curing system. The properties observed in the product indicate suitability as a coating. Those of ordinary skill in the art may see other applications.

Example III demonstrates the superiority of properties obtained on curing an epoxy resin with an amidoamine prepared from t-butyl isophthalic acid rather than isophthalic or dimer acid.

The data of Example IV shows that the condensation product amidoamine of t-BuIPA and EDR-192 cures more slowly than amidoamines prepared from EDR-148, however the coatings exhibited more flexibility in addition to exhibiting more toughness and hardness.

Additionally, it can be seen in Examples V and VI that the addition of JEFFAMINE ®230 with amidoamine condensation prodcuts previously demonstrated allows for even more rapid curing and hardening of the surface without compromising the desirable properties demonstrated in Examples I and IV.

Example II demonstrates the desirable adhesive properties obtained by using an amidoamine produced from phenylindane dicarboxylic acid.

EXAMPLE 1

Coatings Properties: Epoxy System Cured with Amidoamines from Phenylindane Dicarboxylic Acid (PIDA) and Polyetheramines.

| | A | B |
|---|---|---|
| Formulation | | |
| Epoxy resin (EEW ~ 185) | 100 | 100 |
| PIDA JEFFAMINE ® EDR = 148 amidoamine | 64 | — |
| PIDA JEFFAMINE ® EDR-192[2] amidoamine | — | 78 |
| n-Butanol | 13.1 | 14.2 |
| Leveling agent[3] | 3.3 | 3.6 |
| Coating Properties: | | |
| Drying time, 6-mil film | | |
| Set to touch, hrs. | 1.2 | 3.5 |
| Surface-dry, hrs. | 4.3 | 6.5 |
| Thru-dry, hrs. | — | 10.4 |
| Pencil hardness after | | |
| 24 hrs, ~25° C. | HB-F | B |
| 7 days, ~25° C. | B-HB | B |
| 24 hours, 25° C., 1 hrs., 125° C. | H | H |
| Gardner impact, in-lbs to fail (dir./rev.) after | | |
| 24 hours, ~25° C. | 16/<4 | >160/>160 |
| 7 days, ~25° C. | 20/<4 | >160/>160 |
| 24 hrs., 25° C., 1 hr., 125° C. | 28/<4 | 40/8 |

[1] Structure = $H_2NCH_2CH_2OCH_2CH_2OCH_2CH_2NH_2$
[2] Structure = $H_2NCH_2CH_2OCH_2CH_2OCH_2CH_2OCH_2CH_2NH_2$
[3] Beetle 216-8 (American Cyanamid Co.)

EXAMPLE 2

Adhesive Properties: Epoxy System Cured with Amidoamines from Phenylindane Dicarboxylic Acid (PIDA) and Polyether Amines

| | A | B |
|---|---|---|
| Formulation | | |
| Liquid epoxy resin (EEW ~ 185) | 100 | 100 |
| PIDA JEFFAMINE ® EDR-148 Amidoamine | | |
| PIDA JEFFAMINE ® EDR-192 Amidoamine | | |
| Adhesive Properties:[1] | | |
| Tensile Shear Strength, psi | 3900 | 5000 |
| T-peel strength, pli | 3.2 | 6.8 |

[1] Cure cycle: overnight at 25° C., one hour, 125° C.

EXAMPLE 3

Coatings Properties: Epoxy Resin Cured with Amidoamine Prepared from T-Butyl Isophthalic Acid (T-BuIPA), Other Dibasic Acids and JEFFAMINE ®EDR-148[5]

| | A | B | C |
|---|---|---|---|
| Formulation | | | |
| Liquid Epoxy resin (EEW ~ 185) | 100 | 100 | 100 |
| t-BuIPA JEFFAMINE ® EDR-148[5]) Amidoamine | 76 | — | — |
| Isophthalic acid JEFFAMINE ® EDR-148 Amidoamine | 58 | — | — |
| Dimer Acid JEFFAMINE ® EDR-148 Amidoamine | — | — | 125 |
| n-Butanol | 14.5 | 12.6 | 11.25 |
| Leveling agent[1] | 3.5 | 3.2 | 4.5 |
| Coatings Properties | | | |

-continued

|  | A | B | C |
|---|---|---|---|
| Drying time, 6-mil film | | | |
| Set-to-touch, hours | 2.5 | 1.6 | 5.1 |
| Surface-dry, hours | 6.2 | 3.7 | 6.3 |
| Thru-dry, hours | 7.2 | >24 | >30 |
| Pencil hardness | | | |
| After 24 hours, ~25° C. | 2B | >3B[2] | 3B[3] |
| After 72 hours, ~25° C. | HB | — | — |
| After 7 days, ~25° C. | F | >3B[2] | >3B[3] |
| 24 hrs, 25° C., 1 hr. 125° C. | 2H | 3B-2B | >3B[4] |
| Gardner impact, in-lbs to fail: (dir/rev) | | | |
| After 24 hours, ~25° C. | 40/8 | 160/140 | >160/>160 |
| After 72 hours, ~25° C. | 32/<4 | — | >160/>160 |
| After 7 days, ~25° C. | 12/<4 | 60/~20 | >160/>160 |
| 24 hrs, 25° C., 1 hr. 125° C. | 28/<4 | <4/40 | >160/>160 |

[1]Beetle Resin 216-8; American Cyanamide Co.
[2]Soft, tacky coating; undercured.
[3]Considerable oily material formed on surface; apparently incompatible.
[4]Slightly tacky surface;
[5]Structure: $H_2NCH_2CH_2OCH_2CH_2OCH_2CH_2NH_2$ Comment: Amidoamine prepared from t-BuIPA and EDR-148 resulted in cured coatings with much better properties than with those prepared with EDR-148 and either isophthalic acid or dimer acid. The amidoamine prepared with t-BuIPA cured more rapidly and formed coatings that were harder with a more durable surface.

EXAMPLE 4

Coatings Properties: Epoxy Resin Cured with Amidoamine Prepared from T-BuIPA or Other Dibasic Acids and JEFFAMINE EDR-192[1]

|  | A | B | C |
|---|---|---|---|
| Formulation | | | |
| Liquid Epoxy resin (EEW~185) | 100 | 100 | 100 |
| t-BuIPA JEFFAMINE ® EDR-192) Amidoamine | 80 | — | — |
| Isophthalic acid JEFFAMINE ® EDR-192 Amidoamine | 70 | — | — |
| Dimer Acid JEFFAMINE ® EDR-192[1] Amidoamine | — | — | 115 |
| n-Butanol | 14.4 | 13.6 | 10.75 |
| Leveling agent[2] | 3.6 | 3.4 | 4.3 |
| Coatings Properties | | | |
| Drying time, 6-mil film | | | |
| Set-to-touch, hours | 5.0 | 3.2 | 6.2 |
| Surface-dry, hours | 7.2 | 5.0 | 8.3 |
| Thru-dry, hours | 20.4 | 23.6 | 11.3 |
| Pencil hardness | | | |
| After 24 hours, ~25° C. | 2B | >3B[3] | 3B[4] |
| After 72 hours, ~25° C. | F | — | 3B |
| After 7 days, ~25° C. | HB | >3B[3] | >3B[3] |
| 24 hrs, 25° C., 1 hr. 125° C. | H | HB | HB |
| Gardner impact, in-lbs to fail: (dir/rev) | | | |
| After 24 hours, ~25° C. | >160/>160 | >160/>160 | >160/>160~ |
| After 72 hours, ~25° C. | >160/>160 | — | >160/>160 |
| After 7 days, ~25° C. | >160/>156 | >160/>160 | >160/>160 |
| 24 hrs, 25° C., 1 hr. 125° C. | 32/60 | 12/40 | >160/>160 |

[1]Structure: $H_2NCH_2CH_2OCH_2CH_2OCH_2CH_2OCH_2CH_2NH_2$
[2]Bettle Resin 216-8; American Cyanamide Co.
[3]Soft, tacky, undercured coating
[4]Slightly tacky surface
[5]Blushed surface Comment: Coatings cured with t-BuIPA EDR-192 amidoamine were of better quality than were those cured with other amidoamines. Although curing was slower than with the amidoamine prepared from EDR-148, coatings were more flexible but were also tough and hard.

EXAMPLE 5

Coatings Properties: Cures with JEFFAMINE ® D-230, Blends of D-230 with t-BuIPA EDR-148 Amidoamine

|  | A | B | C |
|---|---|---|---|
| Formulation | | | |
| Liquid Epoxy resin (EEW~185) | 100 | 100 | 100 |
| JEFFAMINE ® D-230/ t-BuIPA EDR-148 Amidoamine Blend | | | |
| 100/0 pbw blend | 32 | — | — |
| 80/20 pbw blend | — | 35.5 | — |
| 60/40 pbw blend | — | — | 41.0 |
| n-Butanol | 10.6 | 10.8 | 11.3 |
| Leveling agent[1] | 2.6 | 2.7 | 2.8 |
| Coatings Properties | | | |
| Drying time, 6-mil film | | | |
| Set-to-touch, hours | 7.9 | 5.8 | 4.9 |
| Surface-dry, hours | 17.2 | 9.9 | 7.8 |
| Thru-dry, hours | 23.5 | 16.2 | 18.6 |
| Pencil hardness | | | |
| After 24 hours, ~25° C. | B | B | B |
| After 48 hours, ~25° C. | B | HB-F | B |
| After 72 hours, ~25° C. | HB | F | HB |
| After 7 days, ~25° C. | H | H | HB |
| 24 hrs 25° C., 1 hr. 80° C., 1 hr. 125° C. | H[2] | H | H |
| Gardner impact, in-lbs to fail: (dir/rev) | | | |
| After 24 hours, ~25° C. | 12/<4 | 12/<4 | 16/<4 |
| After 48 hours, ~25° C. | 12/<4 | 12/<4 | 16/<4 |
| After 72 hours, ~25° C. | 16/<4 | 16/<4 | 16/<4 |
| After 7 days, ~25° C. | 16/<4 | 12/<4 | 16/<4 |
| 24 hrs 25° C., 1 hr 80° C., 1 hr 125° C. | >160/48[2] | ~80/20 | 60/20 |

[1]Beetle Resin 216-8; American Cyanamide Co.
[2]Cure cycle: 24 hours ~25° C., 1 hr., 125° C.

Comment: Blends of JEFFAMINE ® D-230 with t-BuIPA EDR-148 amidoamine result in epoxy coatings that cure more rapidly and surface harden more rapidly than when D-230 is used as a sole curative.

EXAMPLE 6

Coatings Properties: Cures with JEFFAMINE ® D-230 and Blends of D-230 with t-BuIPA EDR-192 Amidoamine

|  | A | B | C |
|---|---|---|---|
| Formulation | | | |
| Liquid Epoxy resin (EEW~185) | 100 | 100 | 100 |
| JEFFAMINE D-230/ t-BuIPA EDR-192 Amidoamine Blend | | | |
| 100/0 pbw blend | 32 | — | — |
| 80/20 pbw blend | — | 35.7 | — |
| 60/40 pbw blend | — | — | 41.4 |
| n-Butanol | 10.6 | 10.8 | 11.3 |
| Leveling agent[1] | 2.6 | 2.7 | 2.8 |
| Coatings Properties | | | |
| Drying time, 6-mil film | | | |
| Set-to-touch, hours | 7.9 | 7.4 | 6.8 |
| Surface-dry, hours | 17.2 | 12.8 | 10.8 |

| | A | B | C |
|---|---|---|---|
| Thru-dry, hours | 23.5 | — | 17.2 |
| Pencil hardness | | | |
| After 24 hours, ~25° C. | B | 3B | 3B |
| After 48 hours, ~25° C. | B | H | H |
| After 72 hours, ~25° C. | HB | H | H |
| After 7 days, ~25° C. | H | H | H |
| 24 hrs 25° C., 1 hr 80° C., 1 hr 125° C. | H[2] | H | H |
| Gardner impact, in-lbs to fail: (dir/rev) | | | |
| After 24 hours, ~25° C. | 12/<4 | 24/<4 | 20/<4 |
| After 48 hours, ~25° C. | 12/<4 | 20/<4 | 28/12 |
| After 72 hours, ~25° C. | 16/<4 | 12/<4 | 16/<4 |
| After 7 days, ~25° C. | 16/<4 | 20/<4 | 32/8 |
| 24 hrs~25° C., 1 hr 80° C., 1 hr 125° C. | >160/48 | 160/76 | 160/60 |

[1]Beetle Resin 216-8; American Cyanamide Co.
[2]Cured 24 hours~25° C., 1 hr, 125° C.

Comments: Again, more rapid curing was achieved with blends containing t-BuIPA EDR-192 amidoamine. Coatings cured with blends rapidly achieved a high degree of surface hardness, flexibility.

EXAMPLE 7

Coatings Properties: Epoxy Resin Cured with JEFFAMINE® D-230, Blends of D-230 with Amidoamine Prepared from t-BuIPA D-230

| | A | B | C |
|---|---|---|---|
| Formulation | | | |
| Liquid Epoxy resin (EEW~185) | 100 | 100 | 100 |
| JEFFAMINE D-230/ t-BuIPA EDR-230 Amidoamine Blend | | | |
| 100/0 pbw blend | 32 | — | — |
| 80/20 pbw blend | — | 35.3 | — |
| 60/40 pbw blend | — | — | 40.5 |
| n-Butanol | 10.6 | 10.8 | 11.2 |
| Leveling agent[1] | 2.6 | 2.7 | 2.8 |
| Coatings Properties | | | |
| Drying time, 6-mil film | | | |
| Set-to-touch, hours | 7.9 | 7.0 | 6.8 |
| Surface-dry, hours | 17.2 | 13.3 | 13.4 |
| Thru-dry, hours | 23.5 | — | 17.5 |
| Pencil hardness | | | |
| After 24 hours, ~25° C. | B | F | F |
| After 48 hours, ~25° C. | B | H | F-H |
| After 72 hours, ~25° C. | HB | H | H |
| After 7 days, ~25° C. | H | H | H |
| 24 hrs 25° C., 1 hr 80° C., 1 hr 125° C. | H[2] | H | H |
| Gardner impact, in-lbs to fail: (dir/rev) | | | |
| After 24 hours, ~25° C. | 12/<4 | 24/<4 | 16/<4 |
| After 48 hours, ~25° C. | 12/<4 | 16/<4 | 16/12 |
| After 72 hours, ~25° C. | 16/<4 | 20/<4 | 12/<4 |
| After 7 days, ~25° C. | 16/<4 | 16/<4 | 16/<4 |
| 24 hrs~25° C., 1 hr 80° C., 1 hr 125° C. | >160/48[2] | >160/160 | >160/>160 |

[1]Beetle Resin 216-8; American Cyanamide Co.
[2]Cure cycle: 24 hours~25° C., 1 hr. 125° C.

What is claimed is:

1. An epoxy resin composition which demonstrates rapid curing even at ambient temperatures to provide materials useful in development of adhesive, coatings, encapsulants, laminates and composite fabrications, said composition comprising an amidoamine prepared from:
   (1) an alkyl substituted aromatic dicarboxylic acid selected from the group consisting of phenylindane dicarboxylic and t-butyl isophthalic acid; and
   (2) a polyetherpolyamine from the group consisting of polyoxyethyleneamine and polyoxypropyleneamine; and
   (3) an epoxy resin where said amidoamine is the curing agent for the epoxy resin and is present in said mixture in an amount sufficient to provide about 0.8 to 1.2 amino groups per oxirane group.

2. The composition of claim 1 wherein the alkyl substituted aromatic dicarboxylic acid for preparing the amidoamine is 1,1,3-trimethyl-3-phenylidane-4',5-dicarboxylic acid, and the amidoamine is of the formula:

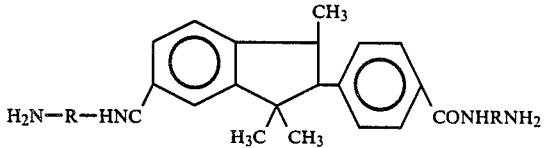

wherein R is a polyether segment selected from the group consisting of polyoxypropylene, polyoxyethylene or a combination of both.

3. The composition of claim 1 wherein the dicarboxylic acid is t-butylisophthalic acid and the amidoamine is of the formula:

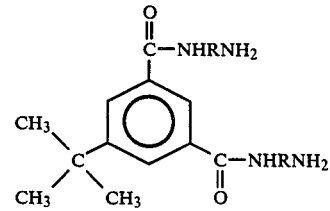

where R = a polyether segment selected from the group consisting of polyoxypropylene or polyoxyethylene.